US008112867B2

(12) United States Patent
Domenico

(10) Patent No.: US 8,112,867 B2

(45) Date of Patent: Feb. 14, 2012

(54) BOX OPENER

(76) Inventor: Anthony J. Domenico, Menifee, CA (US)

( * ) Notice: Subject to any disclaimer, the term of this patent is extended or adjusted under 35 U.S.C. 154(b) by 1024 days.

(21) Appl. No.: 12/014,901

(22) Filed: Jan. 16, 2008

(65) Prior Publication Data

US 2009/0178268 A1 Jul. 16, 2009

(51) Int. Cl.
*B23P 11/00* (2006.01)
*B23P 25/00* (2006.01)
*B26B 3/00* (2006.01)

(52) U.S. Cl. .......................... 29/525.01; 29/458; 30/314

(58) Field of Classification Search ............... 29/525.01, 29/428, 527.1, 527.2, 242, 592, 458, 460; 30/314, 340, 294, 286–291, 25; 83/13
See application file for complete search history.

(56) References Cited

U.S. PATENT DOCUMENTS 2,810,194 A 10/1957 Unsinger
3,365,798 A 1/1968 Cunningham
3,673,687 A 7/1972 Phillips et al.
3,751,806 A 8/1973 Patrick
4,134,206 A 1/1979 Beermann
4,680,861 A 7/1987 Meurer
D294,797 S 3/1988 Itoh
5,046,253 A 9/1991 Ireland
5,127,162 A 7/1992 Mansfield
5,282,316 A 2/1994 Anderson
5,285,577 A 2/1994 Carney et al.
D352,440 S 11/1994 Perigny
5,419,044 A * 5/1995 Valliere .............................. 30/2
D381,886 S 8/1997 Domenico
5,829,321 A 11/1998 Domenico
6,513,249 B2 2/2003 Linton et al.

* cited by examiner

*Primary Examiner* — John C Hong

(74) *Attorney, Agent, or Firm* — Nydegger & Associates

(57) ABSTRACT

A cutting tool and its method for manufacture involves a blade member having an extension. Together, the blade member and extension are die cut from sheet metal and a cutting edge is then formed adjacent the extension. A metal or plastic handle is formed with a slit, and the blade member is positioned in the slit to leave the cutting edge exposed between the extension and the handle. The blade member is then secured to the handle.

20 Claims, 1 Drawing Sheet

BOX OPENER

FIELD OF THE INVENTION

The present invention pertains generally to cutting implements and their method of manufacture. More particularly, the present invention pertains to methods for manufacturing box cutters. The present invention is particularly, but not exclusively useful as a method for manufacturing box cutters having high strength blades that are effectively shielded to prevent an unintentional or an intentional infliction of injury to the user or to another.

BACKGROUND OF THE INVENTION

Many different laminar-shaped materials are used for many different purposes. As an example of a common use for such a material, consider a cardboard box. Cardboard boxes are well known for their use as shipping or storage containers. For this purpose they are typically configured as a unitary enclosure wherein the various panels of the enclosure are folded and sealed together with commercially available tapes. Typically, such boxes are designed for a one-time use, and it is expected the cardboard may eventually be cut to open the box and retrieve articles or items from inside the box. As another example, consider straps or belts that are used to hold or confine something. There are times when they too must be cut, rather than loosened in a more conventional manner. Many other examples can, of course, be given wherein laminar materials are used and may need to be cut.

Cutting laminar-shaped material can be a difficult task. This is particularly so if no edge to the material is directly and easily accessible (e.g. a box). In such cases, it is normally necessary to somehow first puncture the material in order to establish access for cutting the material. Also, if the material has any appreciable strength or thickness, the use of a common tool, such as a scissors, may be impractical; if not impossible. A consequence of all this is that special tools have been developed for purposes of cutting laminar-shaped materials.

Heretofore, an undesirable feature of lamina cutters has been the unprotected exposure of their cutting edge. Specifically, box-cutters and knives that will both penetrate the material, and then cut through the material, have been made with the expectation that the cutting edge will remain openly exposed and unprotected. On the other hand, lamina cutters that are specifically designed with protected blades have typically had to rely on some means, other than the tool itself, to provide initial access for the blade's cutting edge. Such access is needed to position the blade's cutting edge where it can make contact with the material that is to be cut.

In light of the above, it is an object of the present invention to provide a dual-function cutting tool that combines a blunt extension for penetrating through a laminar material, with a protected blade that is exposed, for cutting the material. Another object of the present invention is to provide a method for manufacturing a cutting tool having a two-piece construction that includes: 1) a dual-function cutting member having both an extension for penetrating the material to be cut and a cutting edge for actually cutting the material; and 2) a handle for holding the cutting member to position the cutting blade in a protected space between the extension and the handle. Yet another object of the present invention is to provide a cutting tool, and a method for its manufacture, that is simple to implement, is easy to use, and is comparatively cost effective.

SUMMARY OF THE INVENTION

In accordance with the present invention, a cutting tool and its method for manufacture involve a dual-function blade member that includes both an extension for puncturing a laminar material, and a protected cutting blade for subsequently cutting the laminar material. The cutting tool, itself, is an integrated two-piece device that includes only the blade member and a handle.

The blade member of the cutting tool is planar, and it has a substantially rectangular shaped body portion. Further, the blade member is flat and has a substantially uniform thickness "t". The above-mentioned extension projects in alignment with, and along, a first side of the blade member. Additionally, the extension has an inside edge that is substantially parallel to the first side of the blade member. A cutting blade is formed on the blade member. Specifically, it is oriented to extend perpendicularly from the inside edge of the extension to a second side of the blade member. Within this orientation, the cutting blade is substantially perpendicular to both the inside edge of the extension and to the second side of the blade member.

The handle of the cutting tool for the present invention is formed with first and second flanges that extend parallel to each other. As so extended, the flanges establish a slit between them. There is a distance "d" between the two flanges (i.e. the width of the slit is "d"), and this distance "d" is equal to or slightly greater than the thickness "t" of the blade member. Each flange has a guiding edge that is located across the slit from the other flange, opposite each other.

For the manufacture of the cutting tool of the present invention, the second side of the blade member is positioned in the slit of the handle, between the first and second flanges (recall $d \geqq t$). This placement orients the cutting blade substantially perpendicular to the guiding edges on the handle. It also positions the inside edge on the extension of the blade member parallel to the guiding edges on the handle. This establishes a slot between them having a width "w". Importantly, the width "w" is sufficiently small, and the cutting blade is sufficiently deep in the slot, so a person using the tool can not be cut by the cutting blade. The blade member is then secured between the flanges of the handle.

Preferably, the blade member with its extension is made of a sheet metal, and the blade member is created by die cutting the sheet metal. The cutting blade can then be formed on the blade member. Alternatively, the blade member can be made of a plastic material. If so, it can be formed by injection molding. In either case, the handle is preferably made of a plastic material, and is formed by injection molding. As envisioned for the present invention, the blade member can be secured to the handle by either glue or bolts. When both the blade member and the handle are made of plastic, the blade member can be secured to the handle by thermo-bonding.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
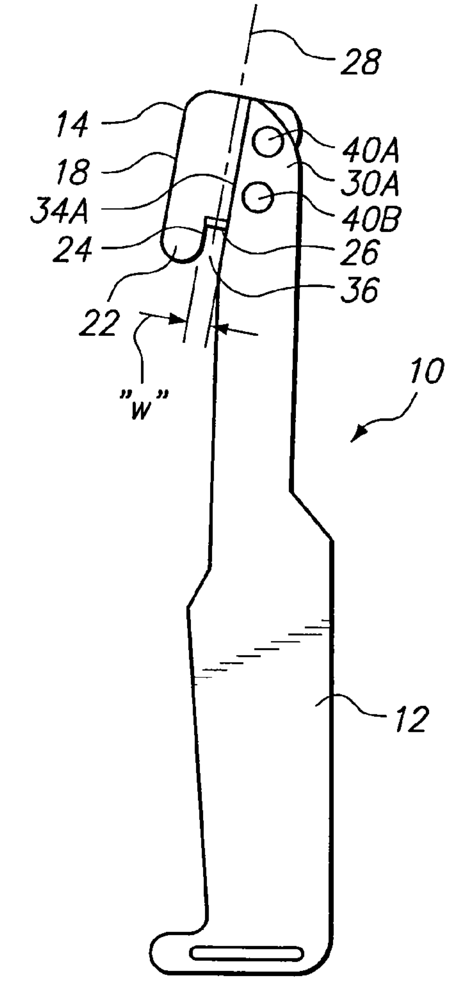
FIG. 1 is a side elevation view of a cutting tool in accordance with the present invention.

Referring initially to FIG. 1, a cutting tool in accordance with the present invention is shown and is generally designated 10. As shown, the tool 10 includes a handle 12 and a blade member 14. Essentially, the tool 10 is only a two-part device (i.e. handle 12 and blade member 14).

Figure 2A:
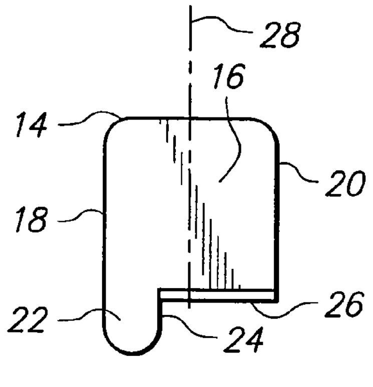
FIG. 2A is a view of the blade member of the cutting tool as seen in FIG. 1 with the handle of the cutting tool removed.
Figure 3:
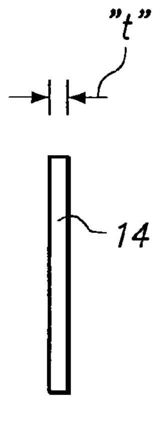
FIG. 3 is an edgewise view of the blade member shown in FIG. 2A or 2B.

Referring now to FIG. 2A, the blade member 14 is shown in complete detail. Specifically, with cross-reference to FIG. 3, it will be appreciated the blade member 14 is substantially flat, and has a thickness "t" that will typically be within a range of 0.05-0.15 inches. Preferably, the blade member 14 is made of a metal (e.g. stainless steel) and is die cut from a sheet of the material. It is possible, however, that the blade member 14 can be made of a strong, durable plastic material.

As shown in FIG. 2A, the blade member 14 has a body portion 16 that is substantially rectangular shaped. It has a side 18 that is opposite, and substantially parallel, to a side 20. Further, the blade member 14 is formed with an extension 22 that extends along the side 18. More particularly, the extension 22 is defined by the side 18 and an inside edge 24 that is parallel to the side 18. As shown in FIG. 2A, the blade member 14 is also formed with a cutting blade 26 that extends between the inside edge 24 and the side 20 of the body portion 16. In a preferred embodiment of the cutting tool 10, the cutting blade 26 will be generally perpendicular to the inside edge 24, and will define a blade axis 28 that is parallel to the inside edge 24 (i.e. perpendicular to the cutting blade 26).

Figure 4:
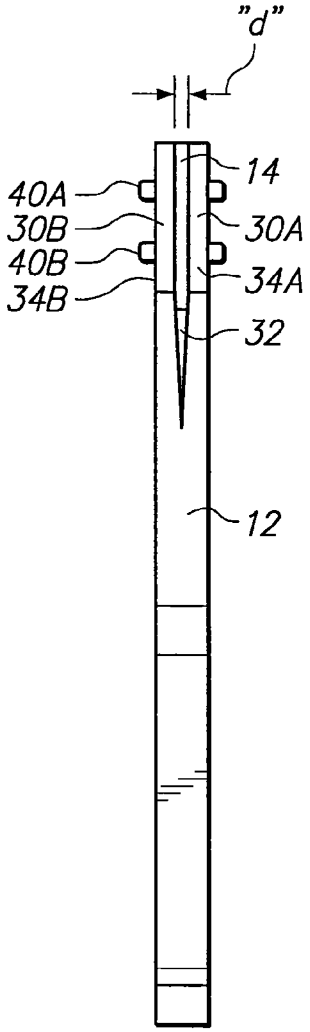
FIG. 4 is an edgewise view of the cutting tool shown in FIG. 1.

FIG. 4 shows that the handle 12 is formed with flanges 30*a* and 30*b* that extend on the handle 12 to establish a slit 32 between them. As indicated, the slit 32 will have a width "d" through most (perhaps, all) of the slit 32. Further, by cross-reference between FIG. 4 and FIG. 1, it will be appreciated that each flange 30*a* and 30*b* has a respective guiding edge 34*a* and 34*b*. For the present invention, these guiding edges 34*a,b* are preferably straight. Further, they are mutually parallel, and they are located directly across the slit 32 from each other.

As most clearly shown in FIG. 1, after the blade member 14 has been joined with the handle 12, the guiding edges 34*a,b* are positioned substantially parallel to the inside edge 24. This positioning establishes a slot 36 between the extension 22 and the handle 12. The slot 36 has a width "w" and, importantly, the width "w" is selected to prevent contact between the cutting blade 26 and a digit of the user (not shown).

Figure 2B:
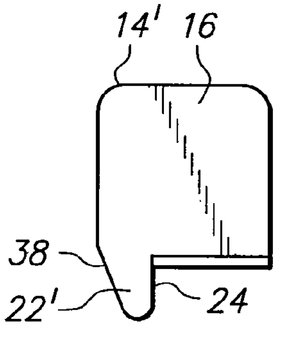
FIG. 2B is an alternate embodiment of the blade member.

For an alternate embodiment of the present invention, a blade member 14' can be shaped substantially as shown in FIG. 2B. In all important respects, the blade member 14' is substantially similar to the blade member 14 disclosed above. The blade member 14', however, includes a slant edge 38 that gives the blade member 14' a narrower extension 22' than is provided for the blade member 14.

In the manufacture of the cutting tool 10 of the present invention, a blade member 14 is created. As indicated above, the blade member 14 is preferably made of a metal material that lends itself to a stamping or die cutting operation. Once a blank blade member 14 has been formed, the cutting blade 26 can be sharpened in a manner well known in the pertinent art. Also, as indicated above, the blade member 14 can be made of a strong durable plastic. If plastic is used, the blade member 14 and a sharpened cutting blade 26 can be created by a well-known injection molding operation.

The handle 12 can be manufactured in either of several ways. For one, if it is to be made of a plastic material, the handle 12, including the flanges 30*a,b* and the slit 32, can be injection molded. For another, if the handle 12 is to be made of a metal, it can be formed into two similar halves (not shown) that can be subsequently joined together. In this case, like the blade member 14, the metal halves for handle 12 can be stamped or die cut. The blade member 14 is then placed between the two halves prior to their being joined together.

Incorporation of the blade member 14 with the handle 12 depends, primarily, on how the handle 12 has been manufactured. For an injection molded plastic handle 12, the side 20 of blade member 14 is positioned inside the slit 32, substantially as shown in FIG. 1. If the blade member 14 is made of metal, bolts 40*a* and 40*b* can then be used to secure the blade member 14 on the handle 12. On the other hand, if the blade member 14 is plastic, and the handle 12 is plastic, they can be joined together by a thermo-bonding process. If the handle 12 is made of metal, and is formed as two halves (suggested above), the blade member 14 can be positioned between the two halves of the handle 12. The bolts 40*a,b* can then be used to secure the blade member 14 on the handle 12. In all cases, the handle 12 and blade member 14 can be joined together by glue.

It is an important aspect of the present invention, that the cutting tool 10 be manufactured using a minimum number of constituent parts (i.e. handle 12 and blade member 14). Further, it is important the methods used for joining these parts together be simplified.

While the particular Box Opener as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for manufacturing a cutting tool which comprises the steps of:

creating a blade member, wherein the blade member is planar and has a substantially rectangular shaped body portion with a first side, opposite and substantially parallel to a second side, the blade member having an extension projecting therefrom along the first side, with the extension having an inside edge substantially parallel to the first side, and with a cutting blade extending between the inside edge of the extension and the second side and substantially perpendicular respectively thereto, the blade member defining a blade axis parallel to the inside edge and the second edge and perpendicular to the cutting blade;

forming a handle, wherein the handle has a first flange extending therefrom and a second flange extending therefrom to establish a slit therebetween, and wherein each flange has a guiding edge located across the slit and opposite each other;

positioning the second side of the body portion in the slit between the first flange and the second flange to orient the cutting blade of the blade member substantially perpendicular to the guiding edges on the handle, and to distance the inside edge of the extension on the blade member from the guiding edges on the handle to establish a slot therebetween, with the slot aligned with the blade axis; and securing the second side of the body portion of the blade member between the flanges of the handle to form the cutting tool.

2. A method as recited in claim 1 wherein the blade member is made of a sheet metal and the creating step is accomplished by die cutting the sheet metal.

3. A method as recited in claim 1 wherein the blade member is made of a plastic material and the forming step is accomplished by injection molding.

4. A method as recited in claim 1 wherein the handle is made of a plastic material and the forming step is accomplished by injection molding.

5. A method as recited in claim 1 wherein the slit between the first flange and the second flange defines a distance "d", wherein the blade member has a width "w", and wherein d>w.

6. A method as recited in claim 5 wherein the securing step is accomplished using glue.

7. A method as recited in claim 5 wherein the securing step is accomplished using bolts.

8. A method as recited in claim 5 wherein the securing step is accomplished using thermo-bonding.

9. A method for manufacturing a cutting tool which comprises the steps of:

separating a blade member from a metal sheet, wherein the blade member has an extension projecting from a body portion, wherein the body portion has a first side opposite and substantially parallel to a second side;

forming a cutting edge on the body portion adjacent the extension;

creating a handle formed with a slit;

positioning the blade member in the slit of the handle to leave the cutting edge exposed between the extension and the handle; and securing the second side of the body portion of the blade member to the handle to form the cutting tool.

10. A method as recited in claim 9 wherein the blade member is planar and the body portion is a substantially rectangular shaped, with the extension projecting from the body portion along the first side, and with the extension having an inside edge substantially parallel to the first side.

11. A method as recited in claim 10 wherein the cutting blade extends between the inside edge of the projection and the second side and substantially perpendicular respectively thereto, the blade member defining a blade axis parallel to the inside edge and the second edge and perpendicular to the cutting blade.

12. A method as recited in claim 11 wherein the handle has a first flange extending therefrom and a second flange extending therefrom to establish the slit therebetween, and wherein each flange has a guiding edge located across the slit and opposite each other.

13. A method as recited in claim 9 wherein the creating step is accomplished by die cutting the sheet metal.

14. A method as recited in claim 9 wherein the blade member is made of a plastic material and the forming step is accomplished by injection molding.

15. A method as recited in claim 14 wherein the handle is made of a plastic material and the forming step is accomplished by injection molding.

16. A method as recited in claim 15 wherein the securing step is accomplished by thermo-bonding.

17. A method as recited in claim 9 wherein the slit between the first flange and the second flange defines a distance "d", wherein the blade member has a width "w", and wherein d>w.

18. A method as recited in claim 17 wherein the securing step is accomplished using glue.

19. A method as recited in claim 17 wherein the securing step is accomplished using bolts.

20. A cutting tool which comprises:

a blade member, wherein the blade member is planar and is created with a substantially rectangular shaped body portion having a first side, opposite and substantially parallel to a second side, the blade member having an extension projecting therefrom along the first side, with the extension having an inside edge substantially parallel to the first side, and with a cutting blade extending between the inside edge of the extension and the second side and substantially perpendicular respectively thereto, the blade member defining a blade axis parallel to the inside edge and the second edge and perpendicular to the cutting blade; and a handle, wherein the handle is formed with a first flange extending therefrom and a second flange extending therefrom to establish a slit therebetween, and wherein each flange has a guiding edge located across the slit and opposite each other, and wherein the second side of the body portion is positioned in the slit between the first flange and the second flange to orient the cutting blade of the blade member substantially perpendicular to the guiding edges on the handle, and to distance the inside edge of the projection on the blade member from the guiding edges on the handle to establish a slot therebetween, with the slot aligned with the blade axis, and further wherein the second side of the body portion of the blade member is secured between the flanges of the handle to form the cutting tool.

* * * * *